United States Patent [19]

Webb

[11] 4,198,192
[45] Apr. 15, 1980

[54] HEAT INSULATOR FOR TURBOCHARGER

[76] Inventor: James W. Webb, 29565 Ruus Rd., Hayward, Calif. 94544

[21] Appl. No.: 924,349

[22] Filed: Jul. 13, 1978

[51] Int. Cl.² ............................................. F01D 25/08
[52] U.S. Cl. .................................... 417/373; 417/407; 415/177
[58] Field of Search ................ 415/177, 178; 417/373, 417/406, 407, 408, 409

[56] References Cited

U.S. PATENT DOCUMENTS

| 2,646,210 | 7/1953 | Kohlmann et al. | 417/407 X |
| 2,801,043 | 7/1957 | Spotz et al. | 417/373 |
| 2,822,974 | 2/1958 | Mueller | 417/373 X |
| 2,860,827 | 11/1958 | Egli | 417/407 |
| 2,918,207 | 12/1959 | Moore | 417/407 X |
| 2,938,659 | 5/1960 | Judson et al. | 417/373 |
| 2,973,136 | 2/1961 | Greenwald | 417/407 |
| 3,099,385 | 7/1963 | Elford | 417/407 |
| 3,565,497 | 2/1971 | Miller | 417/407 X |
| 3,740,170 | 6/1973 | Miller | 417/407 |
| 4,101,241 | 7/1978 | Kasuya | 417/407 X |

FOREIGN PATENT DOCUMENTS 722515  1/1955  United Kingdom ................... 415/177

Primary Examiner—Leonard E. Smith
Attorney, Agent, or Firm—Bielen and Peterson

[57] ABSTRACT

An improved turbocharger including a turbine connected to an air compressor via a common shaft which is supported by a bearing. The bearing housing has an end portion adjacent the turbine which includes an end surface. A shroud heat shields the one end portion of the bearing housing from the heat generated by the turbine. The device further includes a spacer interposed the shroud and the bearing housing end surface consisting of two plates angularly connected to one another. The spacer forms a chamber between the two plates. A support member retains the spacer into engagement with the end surface of the bearing housing and the shroud.

5 Claims, 4 Drawing Figures

HEAT INSULATOR FOR TURBOCHARGER

BACKGROUND OF THE INVENTION

The present invention relates to a novel improvement to a turbocharger in the form of means for heat insulation thereof.

Turbochargers have been used in the automotive industry to increase the air flow entering an internal combustion engine. Briefly, turbochargers employ the very hot exhaust gases from a vehicle engine to turn a turbine. This turbine motivates an air compressor, generally along a common shaft, to supply cold air to the intake manifold of the vehicle engine. The copious supply of air serves as a supercharger which increases the efficiency and power of the vehicle engine. In the past difficulties have arisen from the transfer of heat from the relatively hot turbine to the bearing along the common shaft.

There is a need for a heat insulation apparatus which will protect the bearing from heat damage as a result of the high temperature operation of the turbine portion of the turbocharger.

SUMMARY OF THE INVENTION

In accordance with the present invention a novel and useful heat insulation device for a turbocharger is provided.

The turbocharger includes a turbine connected to an air compressor via a common shaft. The shaft is supported by a bearing. A bearing housing surrounds the bearing with provision for entrance thereto by the common shaft. The bearing housing presents an end portion to the relatively hot turbine. The bearing housing adjacent the hot turbine also includes an end surface which may be curved.

The shroud means heat shields the curved end portion of the bearing housing from the heat generated by the turbine. Interposed and shroud means and bearing housing is a spacer or packing. The spacer of the present invention includes a first and second plate, the first plate angularly connected to the second plate. A hollow chamber is thus formed inbetween the first and second plates of the spacer.

The present invention further embraces means for causing engagement of the curved end of the bearing housing and the shroud means by the spacer. Such engagement means may include the provision of forming the first or second plate of flexible material. Thus, the spacer may be wedged between the bearing housing end portion and the shroud means. Where the end surface of the bearing housing is a curved surface, the first plate of the housing may be constructed to conform thereto.

The engagement means may also have the combination of a turbine housing and strap means for substantially surrounding the exterior of the turbocharger. Cinching of the strap means would hold the bearing housing, spacer, and heat shroud in slight compression.

It may be apparent that a novel and useful heat insulation device for a turbocharger has been described. It is therefore and object of the present invention to provide a heat insulation device for a turbocharger which efficiently prevents the transfer of heat from a turbine to the bearing supporting the common shaft between the turbine and the air compressor.

It is another object of the present invention to provide a heat insulation device for a turbocharger which includes a spacer between a heat shroud and a bearing housing which provides an insulation chamber and concurrently offers wedging support thereto.

It is another object of the present invention to provide a heat insulation device for a turbocharger which will easily permit the replacement of the bearing supporting the common shaft between a turbine and an air compressor and also permit salvage of the turbine rotor.

It is yet another object of the present invention to provide a heat insulation device for a turbocharger which may be successfully employed on an automotive vehicle.

Another object of the present invention is to provide a heat insulation device for a turbocharger having a spacer constructed of heat resistant metal which also provides wedging support between a bearing housing and a heat shroud.

The invention possesses other objects and advantages, especially as concerns particular features and characteristics thereof, which will become apparent as the specification continues.

Various aspects of the present invention will evolve from the following detailed description of the preferred embodiments thereof which should be taken in conjunction with the accompanying drawings.

DESCRIPTION OF THE PREFERRED EMBODIMENTS

Figure 1:
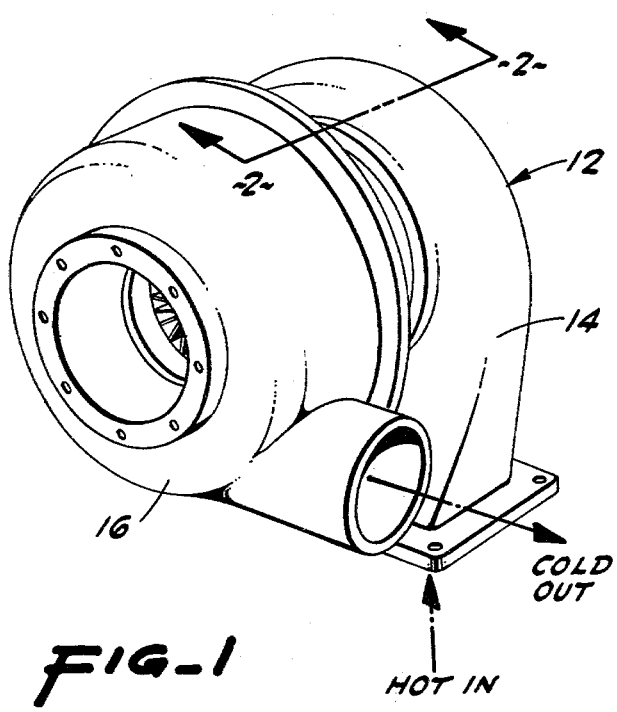
FIG. 1 is a perspective view of the turbocharger of the present invention.

The invention as a whole is designated in the drawings by reference character 10. FIG. 1 depicts a typical turbocharger 12 having a relatively hot turbine end 14 and a relatively cold air compressor end 16. Hot gases would enter turbine end 14 from the exhaust of the vehicle. Typically, such gases would possess the temperature of between 550° and 650° C. (denoted by "hot end"). By contrast, the air compressor end of turbocharger 12 would deliver cold air at about the temperature of 85° C. Consequently to construct an air compressors side by side with a heat turbine requires excellent heat insulation therebetween.

Figure 2:
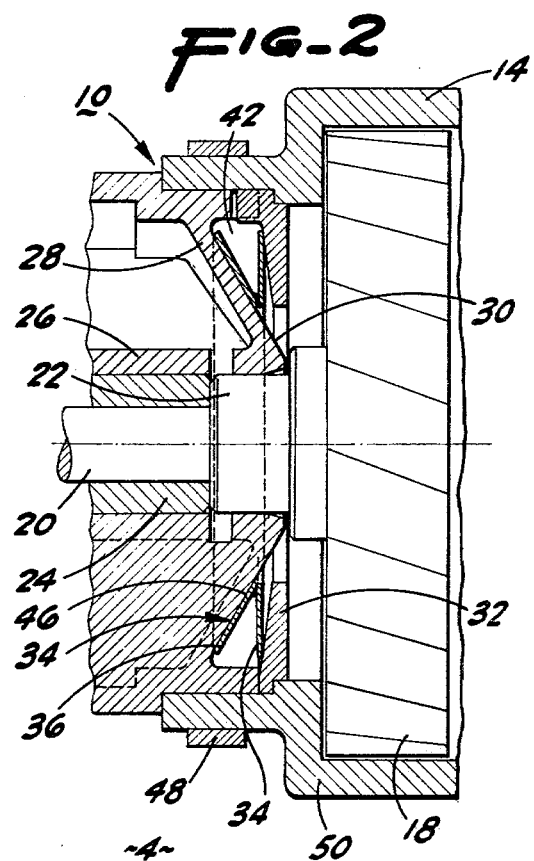
FIG. 2 is a broken sectional view taken along line 2—2 of FIG. 1.

Turning to FIG. 2 we see that turbine end 14 includes wheel 18 connected to shaft 20 by hub 22. A journal bearing 24 supports shaft 20 which leads to air compressor end 16. Air compressor 16 is of the conventional type and will not be described in more detail herein.

Bearing housing 26 surrounds and holds journal bearing 24 in place. Bearing housing 26 also has end portion 28 which includes end surface 30. Shroud means 32 generally circumvents end portion 28 of bearing housing 26 and heat shields end portion 28 from turbine end 14 of turbocharger 12.

Spacer or packing means also generally surrounds end portion 28 of bearing housing 26 and is interposed bearing housing 26 and shroud means 32. Spacer 34 is constructed with first plate 36 and second plate 38 which are angularly connected to one another. As shown in the drawings the preffered embodiment spot welds first plate 36 to second plate 38 at welding points 40, FIGS. 2, 3, and 4. First and second plates 36 and 38 may be formed heat resistant material such as metal, plastic and the like. Also, plates 36 and 38 may be slightly flexible to provide wedging or springing action between shroud means 32 and end portion 28 of bearing housing 26.

Figure 4:
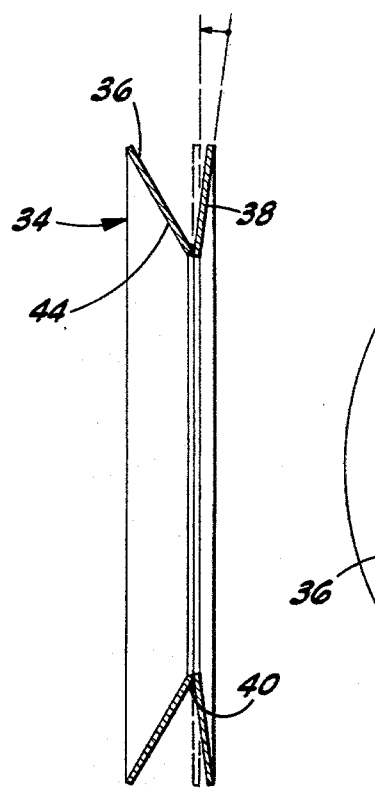
FIG. 4 is a sectional view of the spacer taken along line 4—4 of FIG. 3.
Figure 3:
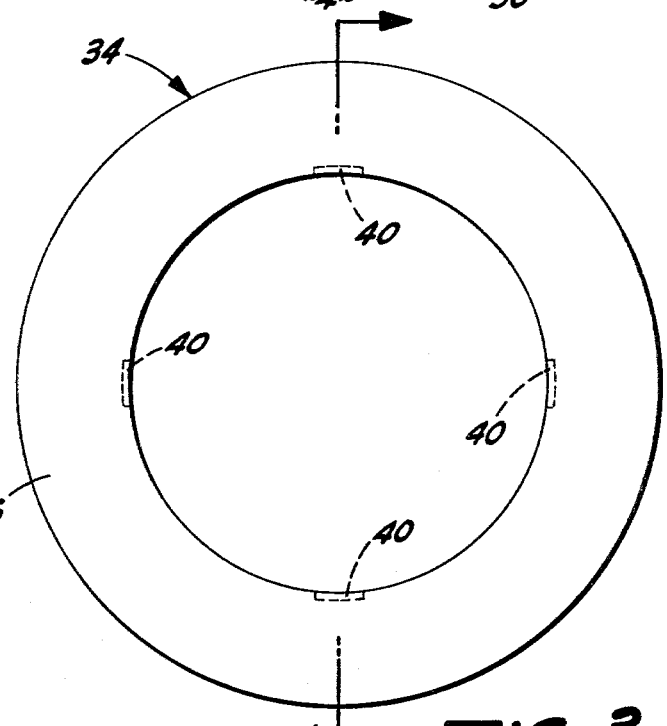
FIG. 3 is a side elevational view of the heat insulating spacer.

As shown on FIGS. 3 and 4 spacer 34 may include plate 38 as being flexibly connected to plate 36. The position of plate 38 in relation to plate 36 during placement between bearing housing 26 and shroud means 32 is shown in phatom. Thus, when assembled spacer 34 is in slight compression. A chamber 42 is formed between plates 36 and 38 and serves to heat insulate bearing 24 and shaft 20 from the heat generated by turbine end 14 of turbocharger 12. Plate 36 may be constructed to conform to end surface 30 of end portion 28. As shown in the preferred embodiment, end surface 30 is shaped as a truncated cone. Likewise the inner surface 44 of the first plate 36 is shaped to lay on end surface 30 over a maximum amount of surface 4. This aids in the dissipation of heat reaching plate 36 from turbine 14 of turbocharger 12.

The device of the present also has means 46 for causing engagement of spacer 34 with end 28 of bearing housing 26 and shroud means 32. Such means 46 may take the form of providing spacer 34 with the spring action herein before described. Also, means 46 may include strap means 48 which cinches around the exterior of turbocharger 12. Specifically, turbine end 14 may include turbine housing 50 which engages shroud means 32 and bearing housing 26. Strap means 48 cinches on the outer surface of bearing housing 50 by any conventional cinching means such as clamps, bolts, and the like. Thus, the cinching action of strap 48 retains spacer 34 in the position shown in phantom of FIG. 4. That is, with a slight force tending to bring together plates 36 and 38 of spacer 34.

In operation turbine wheel 18 connects via common shaft 20 to an air compressor (not shown) on compressor end 16 of turbocharger 12. Shaft 20 is supported by a journal bearing 24 and is heat shielded from the turbine end 14 by end portion 28, spacer 34, and shroud means 32. Spacer 34 also performs the function of retaining the separation between shroud means 32 and end portion 28 of bearing housing 26 in conjunction with means 46 for causing engagement of the same.

While in the foregoing specification embodiments of the invention have been setforth in considerable detail for the purposes of making a complete disclosure of the invention, it will be apparent to those of ordinary skill in the art that numerous changes may be made in such details without departing from the spirit and principals of the invention.

What is claimed is:

1. A turbocharger combination including a turbine connected to an air compressor having a common shaft supported by a bearing, the improvement comprising:
    a. a bearing housing having one end portion adjacent the turbine, said bearing housing one end portion including an end surface;
    b. shroud means for heat shielding said one end portion of said bearing housing from the heat generated by the turbine;
    c. a spacer interposed said shroud means and said bearing housing, said spacer having a first and second plate, said first plate angularly connected to said second plate, forming a chamber therebetween; and
    d. means for causing engagement of said one end of said bearing housing and said shroud means by said spacer.

2. The turbocharger of claim 1 in which said engagement means includes selectively forming said first and second plate from flexible material to form means for wedging said spacer between said bearing housing and said shroud means.

3. The turbocharger of claim 2 in which said bearing housing end surface of said one end portion thereof comprises a curved surface and said first plate of said housing includes a curved surface engaging said curved surface of said bearing housing end surface.

4. The turbocharger of claim 3 in which said means for causing engagement of said one end of said bearing housing and said shroud means further includes strap means substantially surrounding the exterior of the turbocharger.

5. The turbocharger of claim 4 in which said means for causing engagement of said one end of said bearing housing and said shroud means further includes a turbine housing engaging said shroud means and bearing housing and said strap means engaging said turbine housing.

* * * * *